United States Patent [19]

Smith et al.

[11] Patent Number: 4,781,510

[45] Date of Patent: Nov. 1, 1988

[54] INSULATION BOARD FEEDER

[75] Inventors: Harvell M. Smith, Denver; Robert R. Coleman, Westminster, both of Colo.

[73] Assignee: Manville Service Corporation, Denver, Colo.

[21] Appl. No.: 786,784

[22] Filed: Oct. 11, 1985

[51] Int. Cl.$^4$ ............................................. B65G 59/02
[52] U.S. Cl. ................................. 414/119; 414/113; 414/900; 187/27; 254/89 R
[58] Field of Search ................... 414/19, 98, 100, 112, 414/113, 117, 118, 119, 131, 900; 271/42, 128, 130, 147; 187/8.59, 20, 27; 254/4 C, 47, 48, 89 R

[56] References Cited

U.S. PATENT DOCUMENTS

| | | | |
|---|---|---|---|
| 1,477,471 | 12/1923 | Wellman | 187/8.59 |
| 1,960,283 | 5/1934 | Walker | 187/8.59 |
| 3,744,540 | 7/1973 | Wirch | 414/32 X |
| 3,806,113 | 4/1974 | Gronlund-Nielsen | 271/128 X |
| 3,875,835 | 4/1975 | Roberts | 409/317 X |
| 3,987,911 | 10/1976 | Euverard et al. | 414/113 |
| 3,999,666 | 12/1976 | Lloyd | 414/119 |
| 4,405,276 | 9/1983 | Wiegand | 414/119 |

FOREIGN PATENT DOCUMENTS

| | | | |
|---|---|---|---|
| 278619 | 8/1970 | U.S.S.R. | 271/128 |
| 734106 | 5/1980 | U.S.S.R. | 414/117 |

Primary Examiner—Leslie J. Paperner
Attorney, Agent, or Firm—John D. Lister; Cornelius P. Quinn; Timothy R. Schulte

[57] ABSTRACT

Insulation board feeding apparatus feeds successive boards from a pallet stack to a grooving machine to make pre-formed duct sections. The apparatus includes a cable driven elevator assembly, a reciprocating transfer carriage with a plurality of pivotable board-engaging fingers which is reciprocated by an air cylinder, and a guide assembly comprised of two non-driven rollers. The machine of the present invention is simpler, more reliable and less expensive to manufacture than its predecessors.

11 Claims, 3 Drawing Sheets

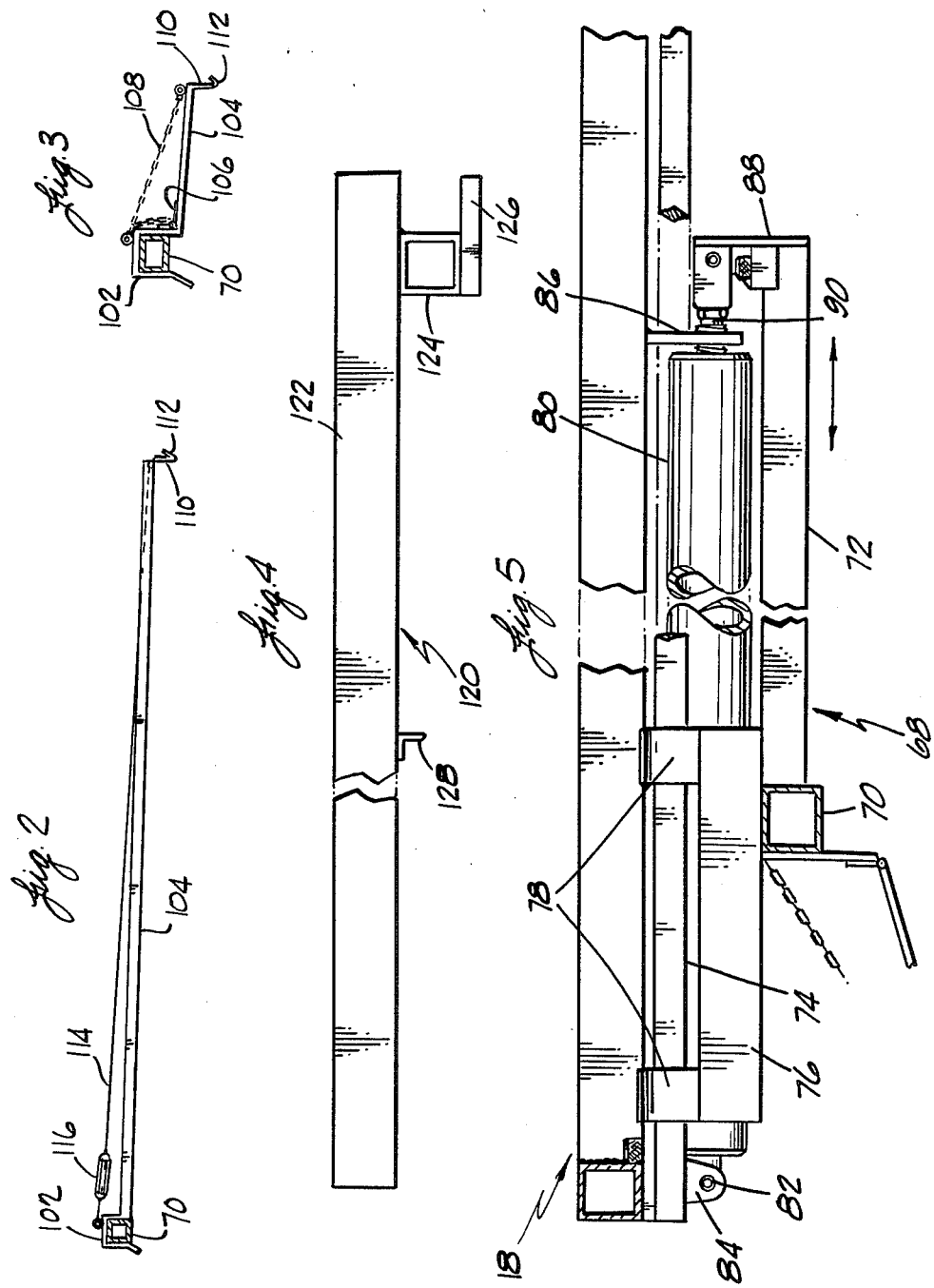

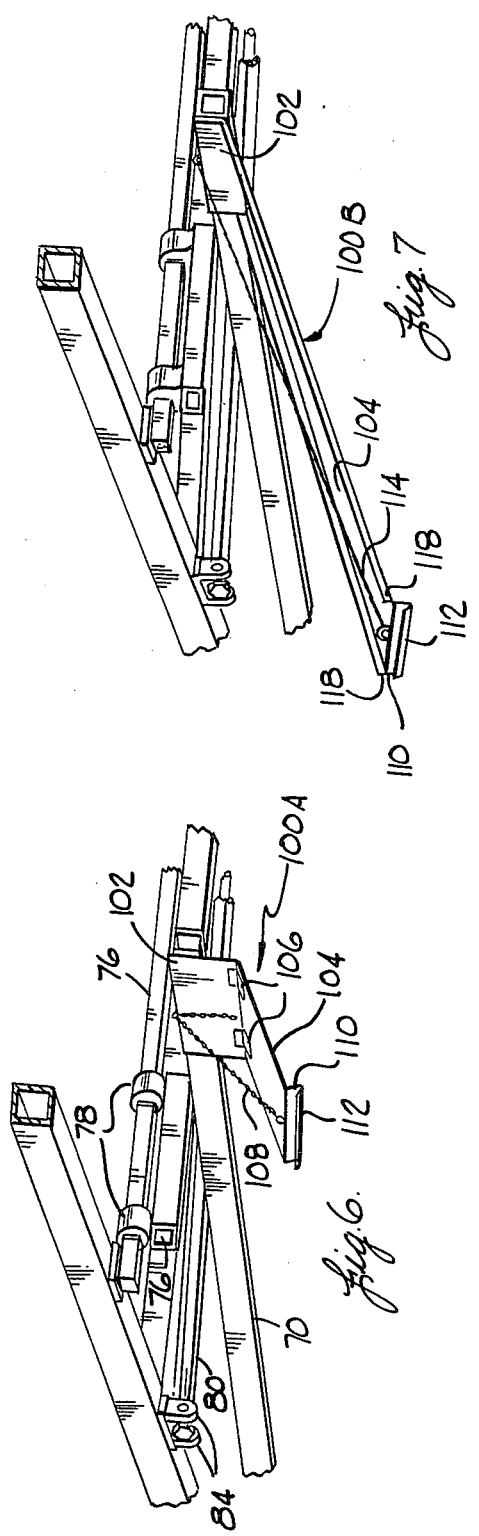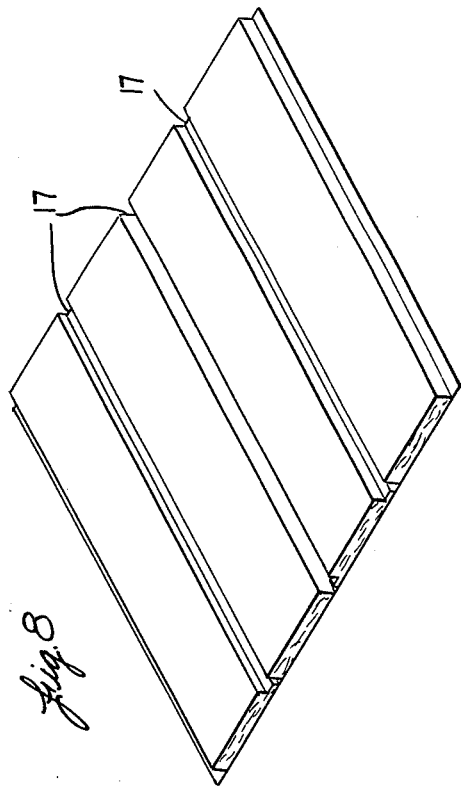

INSULATION BOARD FEEDER

BACKGROUND OF THE INVENTION

The present invention relates to apparatus for feeding insulation (or duct) board to a grooving machine to create preformed duct sections. More particularly, the present invention constitutes an improvement over the machine described and claimed in commonly assigned U.S. Pat. No. 3,875,835 issued to Edwin E. Roberts.

The Roberts machine comprised feeding apparatus including an elevator assembly, a pair of aligning assemblies, and a transfer assembly, along with grooving apparatus. As a practical matter, it became necessary to subdivide the insulation board feeding mechanisms from the actual grooving or cutting mechanisms as shown in the Roberts machine. The resulting grooving machine was essentially the same as section 22 of the patented machine, having a powered infeed section, grooving knives with a backing roller, and a drawing assembly comprised of powered rollers to draw the board section through the cutting assembly. It is the board feeding apparatus to which the present invention is directed.

The transfer assembly of the Roberts machine comprised a horizontal bar extending substantially the width of the machine. This feed bar was reciprocated through a short stroke by an eccentric. The length of the stroke was only sufficient to move the board into contact with the powered rolls of the grooving assembly. The elevator assembly, transfer assembly and alignment mechanism were all driven through chains and sprockets by three separate motors.

Variations in thickness and density which invariably occur in the formation of such insulation boards, produced significant problems for the Roberts machine. A thickness variation at a particular board location of as small as 1/32", cumulative through a full stack of boards, could produce a positional variation across the 8' width of the feeder exceeding the 1" thickness of the board. The elongated feed bar would, accordingly, engage and attempt to feed the top two boards resulting in jamming. In addition, density variations (from variances in fiber and/or binder distribution) created problems for the grooving knives. Due to the short stroke of the feed bar, the only motive force being applied to the board at the time the blades initially contacted the board was by infeed rollers 74 and 76. These density variations resulted in greater resistance being experienced by one or more knives than by the other knives causing the board to skew. Such skewing again caused jamming of the equipment and resulted in creation of a scrap part.

The last problem associated with the Roberts machine was the cost. The three separate motors, plus the chain and sprocket drives, made the apparatus very expensive to manufacture. This high entry cost associated with getting into the duct-fabrication-from-insulation-board business significantly limited the growth of the insulation board market.

SUMMARY OF THE INVENTION

The improved design of the present invention remedies the problems associated with the Roberts machine. The feed bar has been replaced by a plurality of spaced board-engaging fingers. Each finger is free to pivot upwardly under the influence of the insulation board as it is raised into the normal positional plane for transfer by the elevator assembly.

A pair of non-driven guide rollers coact with the powered entry rollers to the grooving machine to provide a double line gripping of the board that locks it against skewing at the time the board is initially engaged by the grooving knives. This system overcomes problems associated with thickness and density variations. The three motors into the Roberts machine have been replaced by a single motor and an air cylinder with a long throw and the chain-and-sprocket drive have been replaced by a simplified cable drive. The improved design reduces the cost of manufacturing the machine by almost ⅔ making such apparatus far more affordable. In addition, this machine is capable of handling both the conventional 4'×10' sheets and the double wide 8'×10' boards. Other characteristics, features and advantages of the present machine will become apparent after a reading of the Detailed Description which follows.

BRIEF DESCRIPTION OF THE DRAWINGS

FIG. 2 is a side detail of the board-engaging finger used with the over-sized board;

FIG. 3 is a side detail of the board-engaging finger used with conventional sized boards and sections thereof;

FIG. 4 is a side view of one of two identical extension supports which are attached to the elevator assembly to accommodate the oversized boards;

FIG. 5 is a side detailed view of the transfer carriage and the air cylinder used to reciprocate the transfer carriage;

FIG. 6 is an enlarged perspective of the transfer carriage with one of the conventional board-engaging fingers mounted thereon;

FIG. 7 is an enlarged perspective of the transfer carriage with one of the oversized board-engaging fingers mounted thereon; and FIG. 8 is a perspective view of a board section following grooving preparatory to making a duct section.

DETAILED DESCRIPTION OF THE PREFERRED EMBODIMENTS

Figure 1:
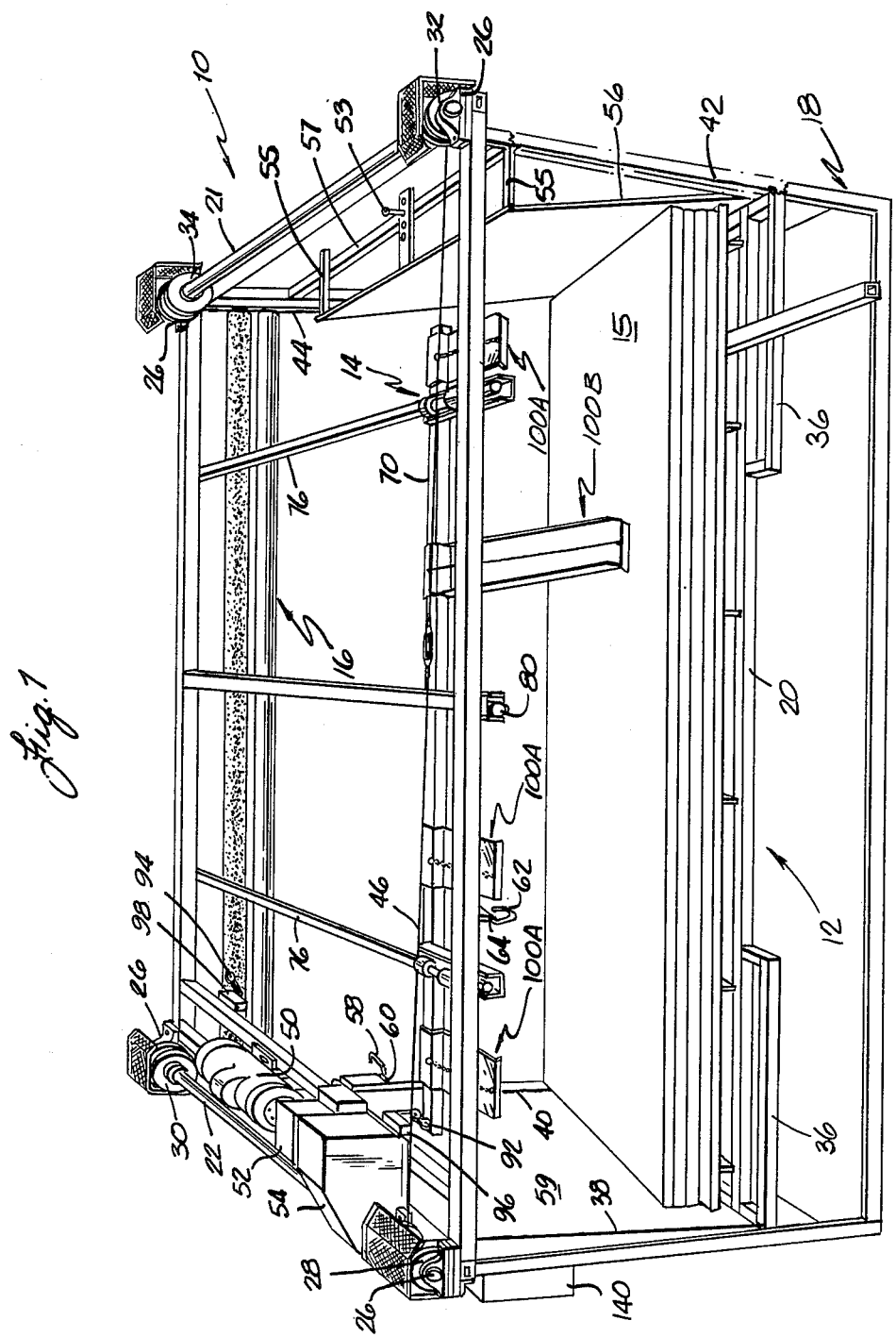
FIG. 1 is a frontal perspective of one embodiment of the board feeding machine of the present invention.

The insulation board feeder of the present invention is shown in FIG. 1 generally at 10. The feeder is comprised of three basic components: elevator assembly 12, transfer assembly 14, and guide assembly 16. These three basic components will be described separately.

Stationary frame 18 is comprised of various horizontal and vertical box-beam members interconnected by welding or the like. A generally rectangular platform 20 is sized to fit within stationary frame 18 and to be movable relative thereto. Atop stationary frame 18 first and second shafts 22 and 24 are rotatably mounted in bearings 26. First and second pulleys 28 and 30 are non-rotatably attached to shaft 22 and third and fourth pulleys 32 and 34 are non-rotatably attached to shaft 24. First, second, third and fourth cables 38, 40, 42 and 44 are attached by one end to pulleys 28, 30, 32 and 34, respectively, and by the other end to each of one of the corners of the rectangular platform 20. The cables 38, 40, 42 and 44 roll onto and off of the inside portions of pulleys 28, 30, 32 and 34.

A fifth cable 46 is interconnected between shafts 22 and 24. In the preferred embodiment, pulleys 28 and 32 are double-sheave pulleys with the second set of grooves accommodating cable 46. However, separate pulleys could be provided for cable 46 without altering the operation of the machine. Cable 46 is situated on pulleys 28 and 32 such that it feeds off the one as it is wound onto the other, e.g., off the top of pulley 28 onto the bottom of pulley 32. This configuration allows shafts 22 and 24 to rotate in opposite rotational directions to accomplish coordinated raising and lowering of the four corners of platform 20. Turnbuckle 48 is provided within cable 46 to permit adjustment in order to properly synchronize shafts 22 and 24 and to counter any misalignment which might result from stretching of the cables. Reversible electric drive motor 50 is connected to shaft 22 through clutch 52 and gear box 54. Clutch 52 may be replaced by a clutch-brake assembly without departing from the scope of the invention. Motor 50 rotates shaft 22 and, through cable 46, shaft 24, to raise and lower platform 20. Stationary ramp 56 is mounted to pivot about its bottom edge for adjustment adjacent one end of platform 20. Any number of means can be provided to permit adjustment of ramp 56. As shown here, a plurality of adjustment fingers 55 each have a series of holes extend above stationary support member 57. Pins 53 each extend through an aperture in adjustment finger 55 into a hole in support member 57. As elevator assembly 12 lifts a stack of boards 15 into position to be transferred, ramp 56 engages one end of the boards and cams them laterally into proper position abutting plate 59. (Note, cables 38 and 40 are actually recessed in notches outboard of plate 59 but are shown in front of the plate for ease of illustration). Either contact arm 58 of switch 60 or arm 62 of switch 64 must be engaged by the upper surface of the board which is on the top of the stack, or transfer assembly 14 is disabled.

Transfer assembly 14 comprises a generally T-shaped carriage 68 formed by transverse box-beam member 70 and projecting box-beam member 72 (FIG. 5). Two slide bars 74 are secured to front and rear structural members of stationary frame 18 as by welding or the like. Two suspension arms 76 are secured to transverse member 20 and supported for reciprocation along slide bars 74 by slide bearings 78. The carriage of transfer assembly 14 is reciprocated along slide bars 76 by an air cylinder 80. Although an air cylinder is preferred, equivalent means such as hydraulic cylinder could also be used.

As best seen in FIGS. 5 and 6, air cylinder 80 is secured to stationary frame 18 by means of a pin 82 and a pair of downwardly extending ears. The other end of cylinder 80 is supported by plate 86 which is secured to the stationary frame as by welding. A vertically-extending plate 88 projects from the end of member 72 and is secured to piston rod 90 of air cylinder 80. As the piston rod 90 is extended and retracted out of an into air cylinder 80, the carriage of the transfer assembly slides along bars 74 from which it is suspended by arms 76. As seen in FIG. 1, contact rollers 92 and 94 of switches 96 and 98, respectively, are engaged by member 70 of the reciprocating carriage. Switches 96 and 98 serve to reverse the direction of air flow in cylinder 80 to control the extension and retraction of transfer assembly 14.

A series of board-engaging fingers 100 are suspended on transverse member 70. If conventional 4'×10' insulation board is to be handled, a series of fingers 100 (FIGS. 3 and 6) are attached to member 70. Most preferably the series comprises three fingers 100A arranged as shown in FIG. 1 (finger 100B would not be used to feed conventional sized board and is shown in FIG. merely for convenience). Two of the three fingers 100A are offset to one end of transverse member 70 to facilitate the feeding of half sections (4'×5') or the like. It is for this same reason that switches 60 and 64 are shown to be at this same end, although they can be variously positioned in other locations, if desired.

Board-engaging fingers 100A are identical and hence only one will be described in detail. A first piece 102 is generally C-shaped and formed of sheet metal. This first piece 102 clamps onto transverse member 70 allowing easy attachment, removal and positional adjustment. A second piece 104 is connected to the first by a pair of hinges 106 (FIG. 6). Chain 108 permits the position of downwardly extending flange 110 to be adjusted to a position preferably below the normal positional plane (i.e., the transfer plane) of the top insulation board. Flange 110 is curled upwardly at 112 to avoid any sharp corners that might damage the insulation board or push it off the stack during the retraction stroke.

If it is desired to feed oversized 8'×10' insulation board with the feeder of the present invention, fingers 100A are replaced by two or three of the fingers 100B (FIGS. 2 and 7). Fingers 100B also have a first piece 102 which is C-shaped to clamp onto member 70. However, second piece 104 is formed integrally with first piece 102. The thin gauge sheet metal tends to pivot downwardly about the junction point between pieces 102 and 104. Cable 114 with turnbuckle 116 is provided to strengthen the finger 100B and prevent excess sagging and even failure at said junction point. Lateral upturned flanges 118 (FIG. 7) are provided the second piece 104 to provide longitudinal reinforcement and torsional stability. The turnbuckle 116 can be used to adjust the position of board-engaging flange 110 in a manner similar to that accomplished by chain 108 for finger 100A.

An additional modification must be made to the machine, besides replacing fingers 100A with fingers 100B, in order to accommodate oversized boards. Two extension supports 120 (only one shown) are affixed to the elevator assembly 12. Each extension support comprises an 8' long box beam member 122 (see FIG. 4), a short transverse piece 124, a clamping plate 126 and a locking angle 128. To use the extension supports 120, clamping plate 126 is pivoted into position below the rear cross member of platform 20 and locking angle 128 positioned inside the front cross member of elevator platform 20 to prevent extension 120 from sliding forward and becoming disengaged. Projections 36 serve to provide a lift point for the oversized boards which is outboard of the stack's center of gravity. This counters the tendency of a full pallet to tip out of the elevator assembly. The guide assembly 16 comprises a pair of non-powered rollers 130 and 132, journaled for rotation in bearings mounted outboard of the stationary frame on a pair of frame ear extensions (not shown). Only the upper glass-engaging roller 132 is provided with a friction increasing surface coating so as not to mar the foil facing material. Rollers 130 and 132 are spaced by a distance which is slightly less than the 1" thickness of the insulation board in order to positively grip it and prevent skewing.

Control box 140 receives the inputs from switches 60, 64, 96, 98 as well as the inputs from two limit switches (not shown) which control the upper and lower positional limits for elevator carriage 20. Control box 140 also controls the electrical output signals for actuating motor 50 and air cylinder 80.

In operation, a full pallet of 4'×10' boards are placed into feeding machine 10 by a forklift truck positioned between projections 36. Once power is turned on at the control box 140, motor 50 will be actuated to rotate shafts 22 and 24 in opposite rotational directions lifting the stack of boards 15 via elevator platform 20. As the stack is lifted, one end of the boards is engaged by ramp 56 to cam the other end into engagement with plate 59. When the uppermost one of boards 15 engage contact arms 58 and 62 of switches 60 and 64, motor 50 is disengaged and piston rod 90 of air cylinder 80 is extended.

Fingers 100A are positioned such that board-engaging flanges 110 are pivoted down below the normal positional plane of uppermost board 15. As the piston rod moves the reciprocating transfer carriage 68 toward the guide assembly 16, the bottom surfaces of second portions 104 engage the board 15 pivoting transfer fingers 100A upwardly so that downwardly extending board-engaging flanges 110 engage one lateral edge of uppermost board 15 sliding it laterally off the stack. The other lateral edge moves into the nip created by rollers 130 and 132 of guide assembly 16 by the sole motive force of the air cylinder 80. The throw of air cylinder 80 is sufficient that the leading lateral edge of board 15 is gripped by the power-driven rolls of the infeed section of the grooving machine (not shown) before transfer carriage 68 is disengaged and retracted. As the board is moved through the grooving machine it is always engaged by two pairs of rollers, either guide rollers 130 and 132 with the powered infeed rolls of the grooving machine or the infeed rolls and the powered drawing rolls of the grooving machine. This double-line clamping action locks the board against skewing as it is engaged by the grooving knives.

As cross member 70 of transfer carriage 68 engages contact roller 94 of switch 98, the direction of air flow to cylinder 80 is reversed retracting carriage 68 and motor 50 is actuated to once again raise the stack. The upwardly curled portion 112 of flange 110 insures that if fingers 100A do engage board 15 on the retraction stroke, they will pivot upwardly over the surface causing no damage to nor misalignment of the board.

To modify the feed apparatus 10 to accommodate oversized 8'×10' insulation boards, extension supports 120 are secured to elevator platform 20 so as to extend outwardly over projections 36. The space between the extension supports will still accommodate a forklift truck carrying a pallet full of boards. Fingers 100A are then replaced by elongated fingers 100B (two are sufficient but three are preferred) and the machine operates in the manner described above.

The insulation board feeding machine of the present invention greatly improves and simplifies the feeding of boards to a duct board grooving machine. The end product comprising a board 15 with grooves 17 formed therein to permit folding into a rectangular duct remains the same (FIG. 8). However, the feeding is performed more reliably with less risk of jamming by a machine which can be built for a fraction of the cost of the abovementioned Roberts machine.

Various changes, alternatives and modifications will become apparent following a reading of the foregoing specification. For example, although the disclosed cable drive for the elevator is preferred, the platform could be raised and lowered by any expedient means such as a hydraulic or pneumatic ram. It is intended that such changes, alternatives and modifications as fall within the scope of the appended claims be considered as part of the present invention.

We claim:

1. In an apparatus for feeding insulation boards sequentially to a grooving machine, said apparatus having an elevator assembly for raising a stack of said insulation boards by means of a generally rectangular platform; a transfer assembly for transferring the top board in said stack to the grooving machine upon its reaching a normal positional plane, said assembly including transfer assembly drive means; and a guide assembly for maintaining the orientation of said board as it is fed into the grooving machine; the improvement comprising:
    said transfer assembly including a reciprocating carriage having a plurality of space board-engaging fingers attached thereto, each of said fingers being pivotable about an axis extending transverse to the direction of transfer, an adjustable chain to permit said fingers to extend below said normal positional plane prior to engagement with the board, said fingers pivoting upwardly about said axis when engaged by said board as it is raised to said normal positional plane by said elevator assembly, said upward pivoting accommodating the configuration of the board being transferred, said board being laterally transferred from the top of said stack into said grooving machine upon activation of said transfer assembly drive means.

2. The apparatus of claim 1 wherein said board-engaging fingers are each hinged intermediate their ends and are adapted for use with conventional 4'×10' insulation boards and shorter sections thereof.

3. Apparatus according to claim 1 wherein each of said fingers includes a flange.

4. Apparatus according to claim 3 wherein said flange includes a curled edge.

5. In an apparatus for feeding insulation boards sequentially to a grooving machine, said apparatus having an elevator assembly for raising a stack of said insulation boards by means of a rectangular platform, a transfer assembly for transferring the top board in said stack to the grooving machine and a guide assembly for maintaining the orientation of said board as it is fed into the grooving machine, the improvement comprising:
    a drive assembly for said elevator, said drive assembly including a first pulley fixedly mounted to a first shaft;
    a second pulley fixedly mounted to a second shaft;
    a third pulley fixedly mounted to said first shaft;
    a fourth pulley fixedly mounted to said second shaft;
    first, second, third and fourth cables each connected between said first, second, third and fourth pulleys and one of the corners of said elevator platform, respectively;
    a fifth cable connected between pulleys on said first and second shafts in such a manner as to be wound up on one of said pulleys while being unwound on the other of said pulleys while the two said shafts are rotating in opposite rotational directions;
    a reversible motor connected to one of said first and second shafts for rotating said shafts to wind and unwind said first, second, third, fourth and fifth cables onto and off of their respective pulleys simultaneously.

6. The apparatus of claim 5 wherein said fifth cable is comprised of two separate lengths interconnected by a turnbuckle permitting adjustment necessitated by cable elongation and the like.

7. In an apparatus for feeding insulation boards sequentially to a grooving machine, said apparatus having an elevator assembly for raising a stack of said insulation boards by means of a generally rectangular platform; a transfer assembly for transferring the top board in said stack to the grooving machine upon its reaching a normal positional plane, said assembly including transfer assembly drive means; and a guide assembly for maintaining the orientation of said board as it is fed into the grooving machine; the improvement comprising:

said transfer assembly including a reciprocating carriage having a plurality of spaced board-engaging fingers attached thereto, each of said fingers being pivotable about an axis extending transverse to the direction of transfer, said board-engaging fingers are each elongated in order to accommodate 8'×10' insulation boards, constructed as sheet metal channel members which have a certain degree of flexibility, provided with a cable linkage to reinforce said sheet metal members, and are each provided with a turnbuckle in the cable linkage to permit the amount which said fingers extend below said normal positional plane to be adjusted prior to engagement with the board, said fingers pivoting upwardly about said axis when engaged by said board as it is raised to said normal positional plane by said elevator assembly, said upward pivoting accommodating the configuration of the board being transferred, said board being laterally transferred from the top of said stack into said grooving machine upon activation of said transfer assembly drive means.

8. The apparatus of claim 7 further comprising a plurality of extension supports removably attached to said elevator platform to accommodate and support the 8'×10' insulation boards.

9. In an apparatus for feeding insulation boards sequentially to a grooving machine, said apparatus having an elevator assembly for raising a stack of said insulation boards by means of a generally rectangular platform; a transfer assembly for transferring the top board in said stack to the grooving machine upon its reaching a normal positional plane, said assembly including transfer assembly drive means; and a guide assembly for maintaining the orientation of said board as it is fed into the grooving machine; the improvement comprising:

said transfer assembly including a reciprocating carriage having a plurality of elongated spaced board-engaging fingers attached thereto, and a plurality of extension supports that can be removably attached to the transfer assembly and the rectangular platform respectively, to accommodate enlarge insulation boards which are up to 8'×10' in size, said elongated fingers transferring the top board in a stack thereof to said grooving machine and said extension supports enabling said elevator assembly to accommodate a larger pallet which is needed to support the larger insulation boards, each of said fingers being pivotable about an axis extending transverse to the direction of transfer, means for adjusting the position of said fingers to extend below said normal positional plane prior to engagement with the board, said fingers pivoting upwardly about said axis when engaged by said board as it is raised to said normal positional plans by said elevator assembly, said upward pivoting accommodating the configuration of the board being transferred, said board being laterally transferred from the top of said stack into said grooving machine upon activation of said transfer assembly drive means.

10. The apparatus of claim 9 wherein each of said elongated fingers comprise a sheet metal channel member which is provided with a cable linkage for reinforcement, each cable linkage being provided with a turnbuckle to permit positional adjustment of said finger.

11. The apparatus of claim 9 wherein said transfer assembly includes an air cylinder attached to a reciprocating carriage upon which said board-engaging fingers are mounted, said air cylinder providing the sole motive force for feeding said insulation boards into said grooving machine.

* * * * *